US010627889B2

(12) United States Patent
Chenchev et al.

(10) Patent No.: US 10,627,889 B2
(45) Date of Patent: Apr. 21, 2020

(54) POWER AND ENERGY PROFILING FOR EFFICIENT VIRTUAL ENVIRONMENTS

(71) Applicant: Microsoft Technology Licensing, LLC, Redmond, WA (US)

(72) Inventors: Margarit Simeonov Chenchev, Sammamish, WA (US); Benjamin M. Schultz, Bellevue, WA (US); Paresh Maisuria, Issaquah, WA (US); Hari R. Pulapaka, Redmond, WA (US); Ankit Srivastava, Bellevue, WA (US); Graham Wong, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 15/882,906

(22) Filed: Jan. 29, 2018

(65) Prior Publication Data

US 2019/0235605 A1    Aug. 1, 2019

(51) Int. Cl.
| | |
|---|---|
| *G06F 1/32* | (2019.01) |
| *G06F 1/3234* | (2019.01) |
| *G06F 8/60* | (2018.01) |
| *G06F 9/445* | (2018.01) |
| *G06F 9/455* | (2018.01) |

(52) U.S. Cl.
CPC .............. *G06F 1/3234* (2013.01); *G06F 8/60* (2013.01); *G06F 9/44505* (2013.01); *G06F 9/45558* (2013.01); *G06F 2009/45591* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | | |
|---|---|---|---|---|
| 2007/0233709 | A1* | 10/2007 | Abnous | G06F 21/629 |
| 2010/0318658 | A1* | 12/2010 | Zorn | G06F 9/5066 |
| | | | | 709/226 |
| 2015/0095515 | A1* | 4/2015 | Krithivas | H04L 49/00 |
| | | | | 709/245 |

(Continued)

OTHER PUBLICATIONS

"International Search Report and Written Opinion Issued in PCT Application No. PCT/US2019/012008", dated Mar. 25, 2019, 15 Pages.

*Primary Examiner* — Zahid Choudhury
(74) *Attorney, Agent, or Firm* — Liang IP, PLLC

(57) ABSTRACT

Deploying containers constrained by power profiles on a host system. A method includes identifying a container template, a set of reusable stored characteristics, to be used for deploying a container instance. The method further includes obtaining a power profile, defining at least one power consumption threshold, for the container instance based on at least one of the set of reusable stored characteristics of the container template or other information about the container instance. The method further includes deploying the container instance on the host system by applying the set of reusable stored characteristics and the power profile by applying one or more configuration layers which causes power to the container instance to be at least one of regulated or monitored based on information in the power profile.

20 Claims, 5 Drawing Sheets

(56) References Cited

U.S. PATENT DOCUMENTS

2016/0378518 A1   12/2016  Antony et al.
2017/0279678 A1    9/2017  Kleynhans et al.
2018/0246812 A1*  8/2018  Aronovich .......... G06F 12/0888

* cited by examiner

POWER AND ENERGY PROFILING FOR EFFICIENT VIRTUAL ENVIRONMENTS

BACKGROUND

Background and Relevant Art

Computers and computing systems have affected nearly every aspect of modern living. Computers are generally involved in work, recreation, healthcare, transportation, entertainment, household management, etc.

Virtual machine-based virtualization provides many of the isolation benefits of physical machines while offering flexibility and density. Container-based virtualization provides an even lighter weight virtualization environment, improved compatibility and lower operational costs. In a containerized based configuration approach, various hierarchical configuration layers are used to configure entities such as containerized operating systems. Additionally, filters can be applied to configuration layers to accomplish the desired configuration for an entity. In particular, an entity, such as a container operating system kernel, can have different portions of different configuration layers exposed to it from a host operating system such that configuration from different configuration layers can be used to configure the containerized entity, but where the containerized entity operates as if it is running in its own pristine environment, even though it is using physical elements from the host operating system. Thus, a given configuration layer could be used as part of a configuration for multiple different containerized entities thus economizing storage, network, and compute resources by multi-purposing them for different container operating systems.

As intimated above, containers achieve their lightweight attributes through sharing aspects of the host operating system. This may include sharing of files and folders, sharing configuration, sharing devices, and sharing operating system services (sometimes referred to as daemons). In some environments, such as friendly multi-tenant hosting, systems may de-duplicate overlapping processes, enabling even more efficient resource utilization. Operating system services are a contributor to process overlap.

Many aspects of computing depend on efficient power utilization. In datacenters, power utilization is a major component of operational expenses. Better efficiency means lower operational cost. In mobile computing, power utilization is a major part of usability and convenience; better efficiency means better user satisfaction. In embedded computing (such as the "Internet of Things"), better efficiency may result in lower battery cost (e.g. smaller batteries cost less), or better availability (as some scenarios require devices to be "always on, always connected"). In all of these environments, understanding and efficiently managing power consumption can have major benefits. As a result, much study and innovation has already taken place in this area. For example, modern operating systems include elements which improve efficiency and reduce power consumption.

Recently however, the growing virtualization technologies (e.g., virtual machines and containers) pose a new set of challenges with respect to synchronization of power usage and settings across multiple stateful systems. Thus, there are challenges in efficiently managing power consumption on systems that host multiple virtual environments. This can be particularly troublesome in containerized operating systems where it may be difficult to manage power usage for individual containers without affecting the entire host system due to the way resources on the host are surfaced to the containers using filters and configuration layers.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a container based computing environment. The method includes acts for deploying containers constrained by power profiles on a host system. The method includes identifying a container template to be used for deploying a container instance. The container template comprises a set of reusable stored characteristics that can be applied to create container instances. The method further includes obtaining a power profile for the container instance based on at least one of the set of reusable stored characteristics of the container template or other information about the container instance. The power profile defining at least one power consumption threshold, including at least one energy per time threshold, for the container instance. The method further includes deploying the container instance on the host system. Deploying the container instance comprises applying the set of reusable stored characteristics to the container instance to cause the container to exhibit the stored characteristics and applying the power profile to the container instance by applying one or more configuration layers which causes power to the container instance to be at least one of regulated or monitored based on information in the power profile.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein include a component referred to herein as a power manager. In the examples illustrated herein, there is a host power manager implemented on the host that is configured to enforce power management for containers. This is accomplished by also including power managers implemented in containers which manage power usage in the containers, but are ultimately subject to the management of the power manager on the host. In particular, this is accomplished by implementing power profiles for containers. A power profile defines hardware and system settings for accomplishing a desired power consumption. The power profiles may further define power consumption thresholds. A power profile can be applied to a running container. The power manager is able to obtain information about power consumed for a particular container. The power manager also has access to the power profiles and is therefore able to determine when a particular container has exceeded a corresponding power consumption threshold. Thus, the host can use the power manager to monitor and/or enforce power consumption thresholds defined by power profiles for containers.

Figure 1:
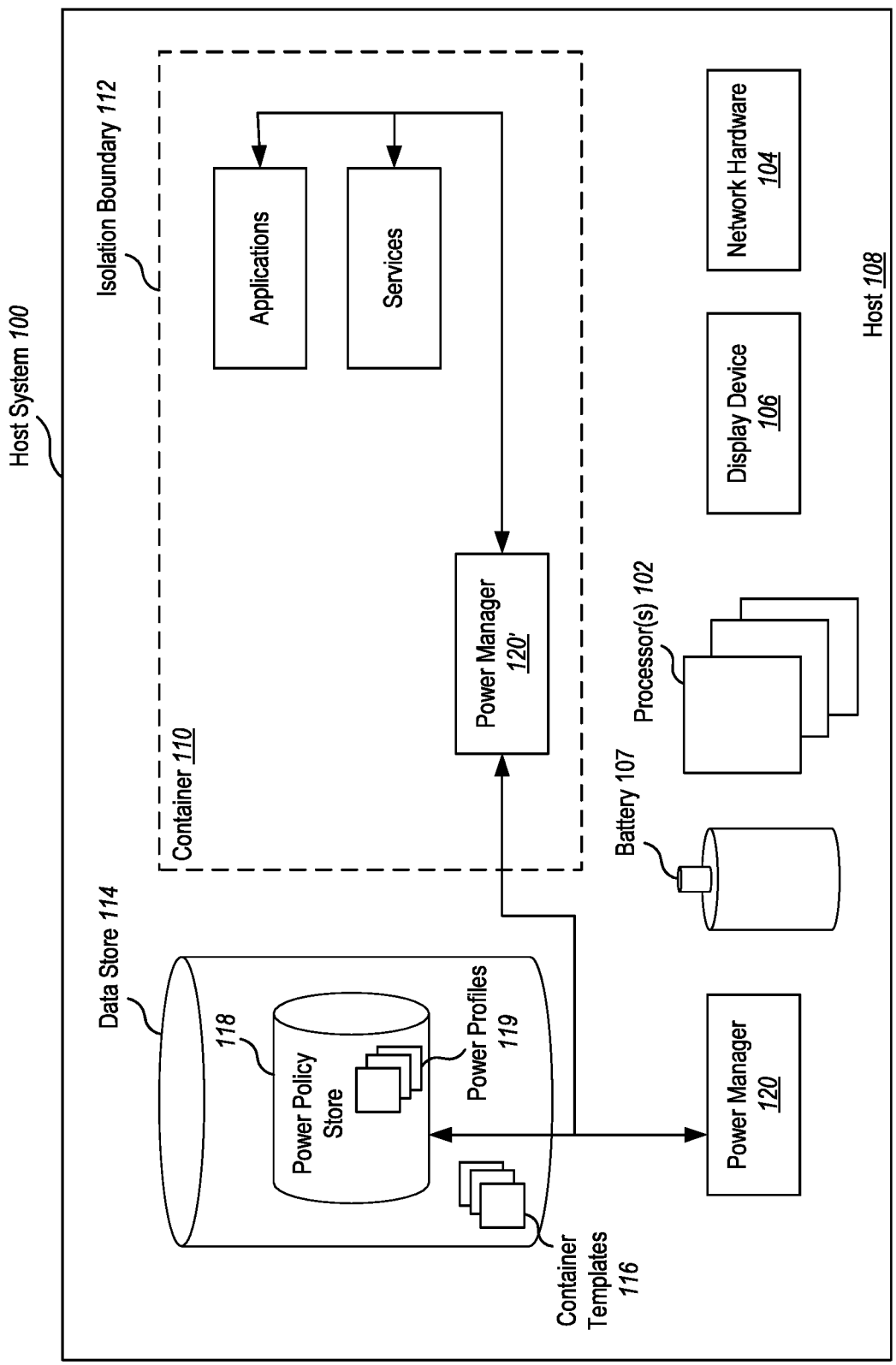
FIG. 1 illustrates a host system implementing a container with one or more power profiles applied to the container.

For example, reference is now made to FIG. 1. FIG. 1 illustrates a host system 100. The host system 100 includes various components including hardware and software components. Example components may include processors, memory, storage, battery, and other peripherals and devices. For example, the host system 100 may include one or more batteries 107 which are configured to provide power to host system 100. In some embodiments the one or more batteries 107 may also have one or more software drivers that collect information from the battery such as voltage, current capacity, battery wear (e.g. full charge capacity), temperature, battery usage, etc. Some embodiments may use this information to inform power configurations or power profiles.

The host system 100 may include a power supply or power supply unit (PSU) that receives power from a power source such as an electric power grid, alternator or other power source. The power supply may one or more software drivers that collect information from the power supply such as voltage, usage, temperature, stability of power output, standby power capacity, etc. Some embodiments may use this information to inform power configurations or power profiles.

The host system 100 includes one or more processors which are configured to perform computing operations on the host system 100. As will be described in more detail below, the processors 102 can be used to perform computing processes for containers hosted by the host system 100. The processors 102 may be any one of a number of different types of processors. For example, in some embodiments, some of the processors are single threaded processors which are only able to handle a single thread of computing functionality at a given time. These processors can be time-division multiplexed between different containers on the host system 100 to allow different containers to use processor functionality.

In alternative or additional embodiments, one or more of the processors 102 may be multithread processors such that for a given processor, a portion of the threads available on the processor can be allocated to a given container while other threads on the same processor can be allocated to a different container. Power consumed by processors is generally proportional to the number of computing cycles, i.e., the number of low-level instructions, executed by the processors.

Power consumption can additionally or alternatively vary based on the ambient temperature in which the processor is running. Thus, an amount of energy consumed by a processor on behalf of a container or application can be estimated using information such as number of cycles performed by the processor and/or the temperature of the processor.

The host system 100 may further include graphical processing units (GPUs). GPUs are a specialized type of processor that can be used to perform specialized types of processing. As with the processors illustrated above, an amount of power consumed for an application or container can often be determined based on the number of computing cycles and/or the operating temperature of the GPU.

FIG. 1 further illustrates that the host system 100 includes network hardware 104. The network hardware 104 is able to be used by containers hosted by the host system 100 to transmit and receive data to and from external computing systems. Note that hardwired network hardware generally consumes small amounts of power when compared with the overall power consumption of the host system 100. However, wireless technologies such as Wi-Fi, tend to consume higher amounts of power when large amounts of data are transmitted and received using the network hardware 104. The amount of power consumed by network hardware 104 by a particular container or application can be determined in some embodiments by determining the amount of data sent and received using the network hardware 104. Additionally or alternatively, power consumed by network hardware 104 may be determined by transmission strength settings for the network hardware 104. In particular, stronger signals require more power. Thus, a calculation of power consumed, in some embodiments, includes a calculation that takes into account both transmission power and amount of data sent or received. In some embodiments, network traffic by hard wired technologies may be specifically excluded when determining power usage of a container or application while specifically including network traffic by wireless networking hardware.

The host system 100 may further include display devices 106. For example, the display devices 106 may include devices such as LCD monitors or other display devices. Power consumed by display devices may be computed and/or estimated in a number of different fashions. For example, the brightness of a display device will affect the amount of power consumed by the display device with brighter display device settings consuming more power than dimmer display devices setting. The contrast of the display device may affect the amount of power consumed by a display device. For example, it is often the case that higher contrast settings on a display device will cause the display device to consume more power than lower contrast settings. Additionally or alternatively, color schemes can affect the amount power consumed by a display device. For example, display devices which are set to display darker color schemes often consume less power than display devices that are configured to display lighter color schemes. Thus, some embodiments may be able to estimate or compute the amount of power consumed by a display device for a container or application based on how the container or application configures a display device, including one or more of brightness, contrast, or color scheme.

Host system 100 may further include additional components and peripherals not illustrated, such as a printer, a camera, a light sensor, a motion sensor, etc. Some embodiments may be able to estimate or compute the power consumed by these components and include it in the container power profile.

The host system 100 includes a host runtime environment, referred to herein generally as host 108. The host 108 includes various applications, services, etc., that can be surfaced to containers. As noted previously, this can be done using various filters and/or configuration layers to expose various applications, services, and configurations to the containers while preventing the containers from seeing other applications, services and configurations at the host 108.

Figure 2:
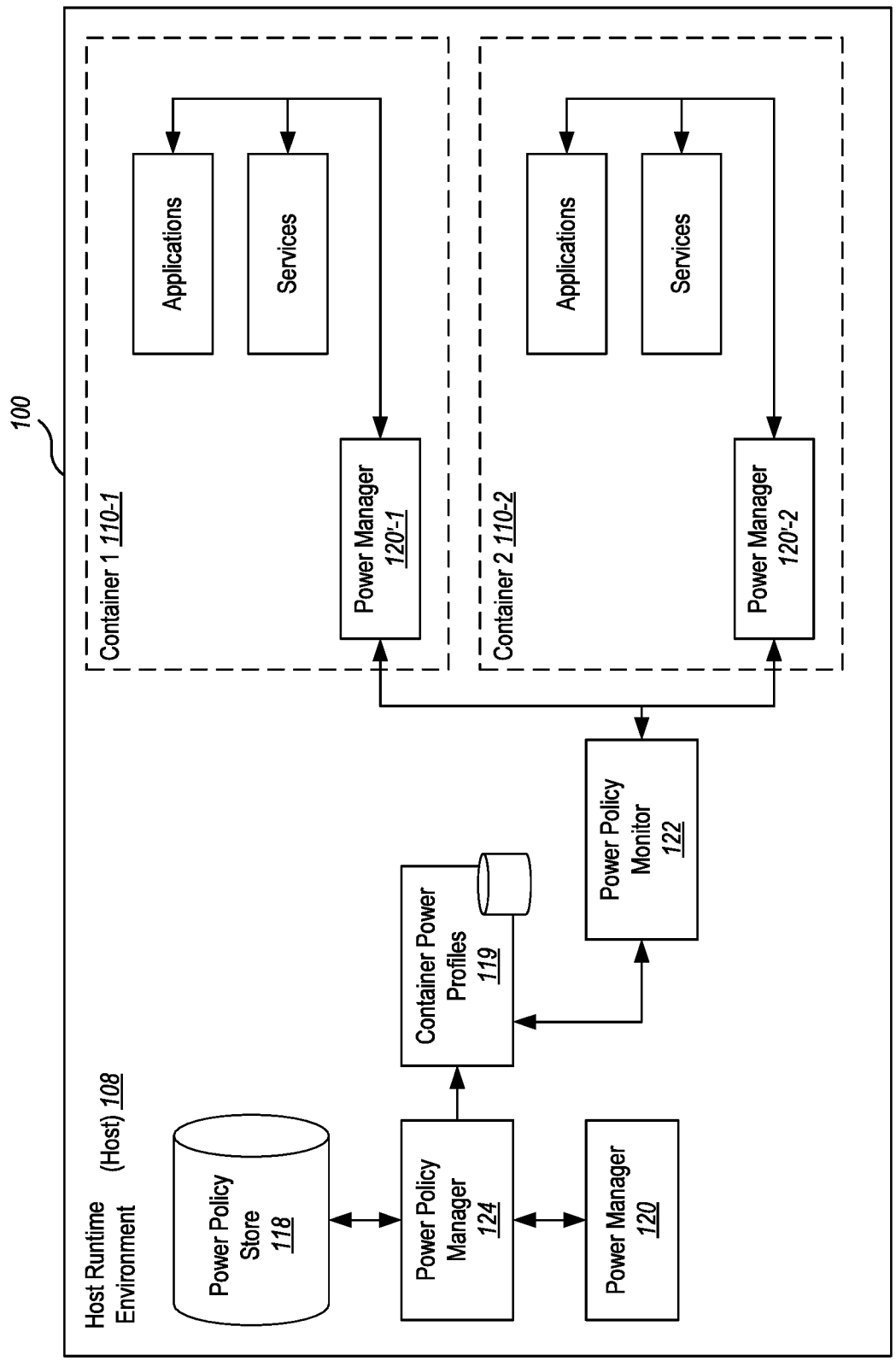
FIG. 2 illustrates a host system implementing a plurality of containers with one or more power profiles applied to the containers in the plurality of containers.

The host system 100 hosts a number of virtual runtime environments, which in the illustrated example, are containers. FIG. 1 illustrates an example container 110. Note that while FIG. 1 shows a single container 110, it should be appreciated that in other embodiments (such as is shown in FIG. 2), multiple containers may be implemented on a host system indeed, much of the efficiency obtained from using containers is achieved by simultaneously using the physical resources of the host system 100 for multiple different containers. A container is a specialized type of virtual runtime environment, In particular, a container is a type of virtual runtime environment where the applications and services in the container are exposed using various configuration layers and layers of filters over applications and services running on the host 108.

The container 110 is isolated from the host 108 by an isolation boundary 112. The isolation boundary prevents certain information from passing from the container 110 to the host 108, but more particularly from the host 108 to the container 110.

With containerization providing an isolation boundary, such as the isolation boundary 112, there are multiple applications of such isolation. These include scenarios such as app security, build-operations, and app deployment that impact a wide array of devices including mobile, desktop, server and cloud. Certain operations require extensive power from the host operating system while others may be minimalistic. Background Activity Manager (BAM) is one example of a real time monitoring system where guest interactions are continuously monitored in order to configure host power management accordingly. However, this requires continuous interaction and memory sharing between the guest and the host boundaries. Additionally, each container will now have its own agent with the same recurring settings if they are used for the exact same purposes. For example, containerized applications such as a browser, a text editor (e.g. Microsoft Word or Apple Pages) and a spreadsheet (e.g. Microsoft Excel or Apple Numbers) might all run in different containers, requiring information consolidation and/ orchestration on the host.

Containers and virtualized environments may be used to isolate potentially malicious websites, apps and software. In this scenario, a container may have malicious code running inside it. To prevent information disclosure and mitigate untimely denial of service attacks (e.g. an app detects low power and starts performing power-intensive processing), containers in this scenario may be implemented such that they do not have the ability to monitor, update or change power input settings of the host 108. In some environments, the host 108 may obscure and/or emulate the power settings for the container before they are provided to the container 112.

Embodiments illustrated herein may implement unique solutions around power profiling and emulating/spoofing power data for virtualization environments.

FIG. 1 further illustrates a data store 114 in the example illustrated in FIG. 1, the data store 114 includes a set of container templates 116. The container templates 116 include enumerations of various characteristics that can be applied to a container instantiated on the host 108. For example, in some embodiments, a container templates may include information defining what applications running on the host 108 should be surfaced in a container instantiation. Alternatively or additionally, a container template may include information defining what services running on the host 108 should be surfaced in an instantiated container.

Note that the data store 114 is illustrated to generally show storage in the host system 100. However, it should be appreciated that various combinations of storage may be used to store the various templates and profiles and that a single store is not required.

Alternatively or additionally, a container template may define trust level for a container. For example, a container with a higher trust level may be given more leeway when performing actions than a container with a lower trust level. Note that while in some embodiments a container template includes trust level information, in other embodiments, the trust level may be applied when instantiating the container. For example, the trust level may be applied based on an entity for which the container is instantiated. Thus for example, if a container is instantiated for an administrative level user, that container may have a higher trust level than if an identical container is instantiated for an ordinary user.

Alternatively or additionally, a container template may define hardware resources of the host system 100 that are available to containers instantiated using the container template. In particular, a container template may comprise information related to hardware devices on the host that are anticipated to be used by the container instance, sometimes referred to herein simply as 'container'.

In the example shown in FIG. 1, the data store 114 further includes a power policy store 118. The power policy store 118 includes a set of power profiles 119. Each of the power profiles in the power profiles 119 defines a power consumption threshold that defines a level of power usage for a container. For example, the power profile may define an amount of power that can be used by a container in terms of a maximum power defined as energy per time, e.g., watts. Alternatively or additionally, the power profile may define an average power consumption threshold. This can be thought of as the rate of consumption of energy over time over time. Alternatively or additionally, the power profile may define a maximum amount of energy that can be used by a container throughout the lifetime of the container. For example, some embodiments may indicate a certain number of joules of energy that could be consumed by container for a threshold condition to be met. The power profile can be selected, and then applied to a container once the container is instantiated or as part of container instantiation. Additionally, in some embodiments, the power profiles may have variable power consumption profiles that are dependent on operating conditions, changes to the container, or for other reasons. Further still, some embodiments can change power profiles for a given instantiated container. This may be done based on changes in operating condition for the container, changed to the container, or for other reasons.

Note that a given power profile does not necessarily include only a single power consumption threshold. Rather, in some embodiments, the power profile may include a plurality of different thresholds, including some thresholds that may be determined in a variable fashion. For example, some power profiles may define thresholds that are dependent upon battery power available at the host system 100. For example, if a battery at the host system 100 has a battery that is charged to 50% of the capacity of the battery, then the power profile may specify a lower power consumption threshold than if the battery at the host system 100 were charged to 100% of the capacity of the battery. In this example, the power profile may include a mathematical formula specifying the power consumption threshold. Alternatively, the power profile may include various battery charge thresholds correlated to corresponding power consumption thresholds, such as in a tabular format.

In alternative or additional embodiments, power profiles may specify other variable factors that can be used to determine the power consumption threshold, and corresponding modalities for determining the power consumption threshold. For example, the power profile may specify processors available on the host system 100, threads available on the host system 100, processor speeds on the host system 100, operating environment (such as temperature) for the host system 100, or other factors affecting the processing power of the host system 100. Note that these variable factors may dynamically change. Hardware capabilities may dynamically be added or removed from the host system 100. A mobile host system 100 may move from an ambient temperature to an extreme temperature. Thus, power profiles may be applied to containers based on what the host system 100 can provide to the containers. Some embodiments may also dynamically re-calculate variable factors and re-apply power profiles to containers based on changing conditions.

Note that the discussion herein will include additional details that illustrate that power profiles can be selected based on some of these same criteria. Thus, in some embodiments a power profile may be selected for a container based on certain initial criteria, but the power profile may additionally or alternatively include additional information that allows power consumption thresholds to change as the initial criteria changes.

Applying a power profile to a container may be accomplished by using a host power manager such as the illustrated power manager 120 and a container power manager 120'. In the example illustrated in FIG. 1, the host power manager 120 includes a corresponding container power manager 120' which exposes power settings for the container 110 using the above-described configuration and filter layering to allow the power manager 120 monitor and/or control power consumption by the container 110. Generally, as used herein, applying a power profile to a container causes power consumption by the container to be at least one of monitored or controlled based on information in the power profile.

Thus for example, the container 110 may be instantiated using a template from the container templates 116. A power profile may be selected from the power profiles 119 based on the characteristics defined in the container template and/or characteristics of how the container 110 will be instantiated.

Characteristics in a container template as to how the container will be instantiated include may include, for example, information such as, applications that will be instantiated in the container, trust level assigned to the container, settings for the container, resources that will be used by the container, etc.

Characteristics of how the container 110 will be instantiated may include characteristics of the host system 100 on which the container is instantiated, the number of other containers instantiated on the host system 100, characteristics of other containers instantiated on the host system 100, whether or not the host system 100 is able to be run on battery power, etc.

The selected power profile can then be applied to the container 110 which causes the container 110 to be monitored and/or controlled based on the applied power profile. In particular, the power managers 120 and 120' can monitor and control how power is used at the container 110.

In some embodiments, characteristics defined in a container template may include an enumeration of applications that will be instantiated in container. An appropriate power profile can be selected (including in some embodiments creation of a power profile) to ensure that the applications enumerated in the container template will have sufficient power to be run in an intended fashion. Note that in some embodiments, this can be determined with high precision. For example, in some embodiments a single application is instantiated in a container. For example in some embodiments, a given container will only instantiate a single application. Indeed, it may be useful to isolate a given application from other components by instantiating the application in a container that does not instantiate or include any other applications. Thus, it can be determined, with high precision, a power consumption threshold that should be applied to the deployed container.

The power profile may be selected based on trust level of the container. For example, containers that have a lower trust level will have a lower power consumption threshold defined in an appropriate power profile as compared to containers that have a higher trust level.

The power profile can be selected based on other containers running on the host system 100. For example, if there is a relatively large number of other containers running on the host system 100, then the power profile for a container to be instantiated may be selected to have a lower power consumption threshold than if there were fewer other containers running on the host system 100. Alternatively or additionally, if other containers running on the host system 100 consume relatively large amounts of power, then a power profile may be selected with a lower power consumption threshold to be applied to a container to be instantiated.

The power profile may be selected based on the ability of the host system 100 to run on battery power. For example, some embodiments may select a power profile that is able to adjust the power consumption threshold based on the charge state of the battery of the host system 100. Alternatively or additionally, in some embodiments, if the host system 100 is configured to run on battery power, then a lower power consumption threshold may be selected so as to conserve battery power.

In some embodiments, the power profile may be selected based on previous instantiations of containers using a particular container template. For example, embodiments may include functionality to monitor power consumption by containers. A determination may be made that well-behaved instances of containers instantiated using a particular container template are expected to have certain power consumption characteristics. An appropriate power profile may be selected to match these observed power consumption characteristics.

Note that this selection may rely on multiple factors to select a power profile. For example, power consumption may differ depending on the type of host system on which the container is instantiated. Alternatively or additionally, power consumption may differ depending on entities (e.g. user identity, user role, user authentication level, application type(s), number of applications, etc.) for whom the container is instantiated. Thus, those of skill in the art will appreciate that various factors can be evaluated together when selecting an appropriate power profile apply to a container being deployed host.

In some embodiments, the power profile may be associated with a particular container template, or a particular container. This may include various attributes of a particular container including provisioned applications, former usage data, user identity, user role, etc. The power manager 120 may calculate what power is available on a given host. Given a current view of circumstances and data about a given container, the power manager 120 determines an optimized time for that container to start and/or an optimized time for that container to run.

In some distributed environments with multiple hosts, the power manager 120 communicates container optimization data to a user, an administrator, and/or management software. This enables a container to run in an optimized environment to ensure it can complete its task. For example, if a user's smartphone has low power, power manager 120 may calculate this and a user's management software may instead launch that container on that user's laptop. This method may also be applied to other environments such as a server or data center.

The following illustrates a number of monitoring and/or control actions that may be performed.

In some embodiments, the power manager 120 and power manager 120' may be configured to determine the amount of power used by the container 110. As noted above, this may be accomplished by monitoring processor cycles used by applications in the container 110, network communications, and in particular wireless network communications, used by applications in the container 110, display device usage by applications in the container 110, and/or in other ways. Examples of how this might be accomplished are illustrated above. This information can be converted to power measurements, such as for example a number of watts used by the container 110. In some embodiments, a processor (which may be an application specific, general purpose, or other processor) may be configured to monitor the amount of power used by the container 110 and/or applications in the container 110. For example, a processor may be configured to monitor overall power usage of the host system 100, monitor various activities being performed by various containers on the host system 100 (e.g. what threads are scheduled, and how they are associated with host system 100 or a specific container), monitor device activities being performed on behalf of either host system 100 or a specific container (e.g. memory usage, file I/O, network I/O, etc.). This information is then correlated to calculate the actual power usage of host system 100 and one or more containers that are running on host system 100. In some embodiments shared components may have power attributed equally among the users, or power may be only attributed to the current user (e.g. a file read for a shared file, a file load into shared memory, a domain name system (DNS) query to a shared cache, etc.).

In some embodiments, a baseline resource utilization and power consumption profile can be used to measure and monitor the power increase caused by an application. For example, in a container, the power manager 120' measures and maintains a baseline. When an application launches, power manager 120' measures a new set of data and compares it to the baseline, notifying power manager 120 of the difference. Note that in some scenarios, the power increase may be independent of the host processor (CPU or GPU) power readings. This power increase may measurable when running any application including games, video, network communications and/or productivity apps.

In some embodiments monitoring information is collected and stored by power manager 120. This monitoring information may be used to inform power profiles and/or be used to trigger updated power profiles to one or more containers.

In some embodiments, if the amount of power consumed by the container 110 exceeds the power consumption threshold defined in the power profile applied to the container 110, then a number of various actions can be performed.

For example, in some embodiments, when the container 110 exceeds the power consumption threshold defined in the power profile, the power manager 120 can detect this situation and cause the host 108 destroy (e.g. pause, halt, recycle and/or delete) the container 110. Indeed, containerization is particularly conducive to this type of control. In particular, containers are often treated as expendable computing entities that can be destroyed with little consequence to protect the host system 100 from attacks or malfunction.

In an alternative or additional embodiment when the container 110 exceeds the power consumption threshold defined in the power profile, the power manager can detect the situation and cause the host 108 to dehydrate the state of the container 110. For example, various state variables stored in various registers of the container 110 can be stored for later analysis. These stored state variables can then be provided to an administrator or other entity for analysis. Additionally, in some embodiments, the stored state variables can be used to rehydrate the container if analysis determines that the container is functioning properly and/or can be rehydrated on the host system 100 without risk. This may be accomplished, for example, by using the container template that was originally used to instantiate the container and then populating various registers with the values that were stored for later analysis.

In an alternative or additional embodiment, when the container 110 exceeds the power consumption threshold defined in the power profile, the power manager causes an alert to be issued to the host 108. In some embodiments, the container 110 will be allowed to continue to operate but the alert can be used to indicate to an administrator or other entity that the container 110 should be monitored. Embodiments can attempt to determine why the power consumption threshold has been exceeded, perform remedial actions, etc.

In an alternative or additional embodiment when the container 110 exceeds the power consumption threshold defined in the power profile, the power manager can detect the situation and cause the host 108 to limit power consumption of the container. Some embodiments may limit at least one of a number of processor cycles over time that may be used by the container, an amount of storage I/O over time that may be performed for the container, an amount of network traffic that may be sent or received for the container over time, or display settings available to the container. This may be implemented by implementing appropriate configuration layers and filters in a containerization system. If the container 110 attempted to exceed the limits placed by the host 108 on processor cycles, storage I/O, network traffic, or display settings, then the host could simply deny access to the resources by implementing appropriate configuration layers and filters.

Thus, when the container 110 exceeds the power consumption threshold defined in the power profile, the power manager 120 and/or power manager 120' can detect the situation and cause the host 108 to modify the container 100 to reduce resource utilization thus reducing power consumption. For example, modifying the container 110 may include limiting or removing one or more applications from the container 110 by appropriate configuration layers. Alternatively or additionally, modifying the container 110 may include allocating less compute resources, storage resources, network resources, display resources, etc. using appropriate configuration layers. Alternatively or additionally, modifying the container 110 may include removing or limiting certain services on the container 110. Using appropriate configuration layers.

In an alternative or additional embodiment when the container 110 exceeds the power consumption threshold defined in the power profile, the power manager 120 and/or power manager 120' can detect the situation and cause the host 108 to offload operations performed for the container 110 to a remote service. This may be implemented in an application-specific manner (e.g. a version of the app runs in the cloud and locally and is informed by power usage). There may be a distributed app framework that enables the app to run both locally and in the cloud and share data. In some embodiments, this may be implemented manually with a user notification for the user to switch applications. For example, an email application running locally would use a web browser to access the same email account as the cloud offload. Alternatively, some embodiments may implement this automatically in a fashion that is seamless or nearly seamless to a user. For example, an app may be configured to use a local backend or a remote backend. When a power consumption threshold is exceeded, then processing would automatically switch to the remote backend. The results of the offloaded operations may be accessible through a web browser, streamed to the container 110 or relayed to the container via network I/O or some other mechanism.

In an alternative or additional embodiment when the container 110 exceeds the power consumption threshold defined in the power profile, the power manager can detect the situation and cause the power manager 120 to spoof a low power setting (e.g. battery at less than 10%) to the container. This may trigger the container runtime to apply a low power settings mode and throttle noisy applications and services.

In an alternative or additional embodiment when the container 110 exceeds the power consumption threshold defined in the power profile, the power manager 120 and/or power manager 120' can detect the situation and cause the host 108 to close one or more applications running on the container 110 based on a utilization metric, such as a number I/O threads being used by the one or more applications, and/or the containers in which the applications run inside. In particular, embodiments may close one or more applications based on a utilization metric that is applied to the one or more applications; not schedule one or more applications based on a utilization metric that is applied to the one or more applications; close one or more applications based on a utilization metric that is applied to a container that the applications run inside; or not schedule one or more applications based on a utilization metric that is applied to a container that the applications run inside. In some embodiments, applications may be selected to be closed based on the number of threads being used for the applications as compared to other applications. For example, in some embodiments, applications may be selected to be closed based on criteria that the least number of application should be closed. A number of threads may be known, which if terminated, would likely cause the container 110 to operate within the power consumption threshold in the power profile. Thus, embodiments may identify an optimal set of applications to close based on the number of threads used by those applications so as to attempt to target the number of known threads.

Determining that the container 110 has exceeded the power consumption threshold may be accomplished in a number of different ways. For example, in some embodiments, an instantaneous rate of power consumption threshold may be used. Thus for example, if the container 110 ever exceeds a threshold wattage of power consumption, then a determination that the container 110 has exceeded the power consumption threshold may be made. Alternatively, the power consumption threshold may be based on consumption of energy over time. Thus for example, if the container 110 exceeds consumption of a certain number of joules of energy over some predetermined time, then a determination can be made that the power consumption threshold has been exceeded by the container 110. In some embodiments, the power consumption threshold may allow the container to "bank" energy from time period to time period. Thus for example, in this embodiment, if the power consumption threshold specifies that the container 110 should not exceed 1 J of energy per second, but the container has one second where the container 110 only consumes half a jewel, then the power consumption threshold may allow the container 110 to consume 1½ J in the next second. In some embodiments, determination of whether or not the container 110 has exceeded the power consumption threshold may be based on aggregating power over time to determine an energy consumption.

Thus as illustrated above, embodiments may be implemented where power settings from a power profile are proxied and/or filtered. As illustrated above, this may be accomplished using the containerization principles illustrated above, whereby configuration layers and filters are used to configure a container. Embodiments may be implemented where performance settings are proxied and/or filtered. As illustrated above, this may be accomplished using the containerization principles illustrated above, whereby configuration layers and filters are used to configure a container.

Additional details are now illustrated with respect to the architecture of various embodiments illustrated herein. The host power manger 120 performs monitoring and control using the appropriate power profile based on several sources of information.

For example, as noted previously herein, embodiments may include functionality for measuring power to a container. For applications and services running on devices its common to measure I/O events and the cumulative processor energy consumed by each I/O to define power use. At an application layer, this includes, measuring thread counts scheduled by each application while actively monitoring energy consumption of each thread. Additional hardware monitoring could include, cumulative processor energy (Joules); cumulative processor (CPU) energy (Joules); cumulative DRAM energy (Joules); cumulative graphics (GPU) energy (Joules)

The power manager 120' for a given container 110 monitors power metrics for the container 110 by accumulating data from each application and correlating it to the full power consumption of the container itself 110.

The power policy store 118 may include additional policies which instruct the power manager 120 to change its behavior based on external/global factors or knowledge. For example: if the host 108 is a part of a cluster and the whole cluster must operate at 50% power, then power control actions may need to be performed by the power manager 120 to limit the amount of power consumed by the container 110. Alternatively, if the host 108 executes time critical workloads there may not be a restriction on the amount of power consumption for containers hosted by the host 108. The policies are also communicated to the container power manager 120' so that they are respected and enforced in virtual environment as well.

Processes on the host 108 report their state and power needs to the host power manager 120. In case of a standalone power supply like a battery, the host 108 also specifies the remaining power on the power source to the power manager 120.

Referring now to FIG. 2, when multiple containers are implemented (represented by containers 110-1 and 110-2) The containers communicate their state and power needs to the host through their respective guest power managers 120'-1 and 120'-2 respectively.

The guest power manager 120' is enlightened to the fact that that it runs in a container environment and instead of trying to set power profiles it communicates its knowledge to the host 108 and lets the host 108 decide how power should be managed. The host can then configure the container appropriately by applying appropriate configuration and filter layers.

Following the design principles of decoupling and cohesion, the architecture in the example illustrated in FIG. 2 includes a power policy manager 124. This component has various functions such as:

1. To determine the trust level of the containers;
2. To push the policies to the containers;
3. To aggregate intelligence from all containers and to decide what power profile the host should have;
4. To aggregate intelligence from all virtual environments and to decide what power profile (if pre-existing) the guests should have;
5. Etc.

In some embodiments, the power policy manager 124 locally calculates the container power profiles based on local data such as resources (e.g. processor, memory, storage and/or network capacity), temperature, user identity, application type, and so forth. These may be locally calculated at boot of host system 100, and/or locally calculated in response to a change event (e.g. additional resource notification such as dynamic memory addition, a network change notification, a temperature threshold, etc.).

In some embodiments, the power policy manager 124 can group containers into swarms and can manage power and performance for them with group policies. It can also identify virtual environments that may not be able to function appropriately with the current power profile of the host and can propose these virtual environments be migrated to another host with a more appropriate power profile.

Over time, the power manager 120 understands and stores the different power consumption requirements for each new container. Multiple containers may require multiple profiles linked to them. A user can also link a specific existing power profile to a new container that they may wish to start.

As systems move towards a more containerized application model where, application security would be guaranteed by containerizing them, systems monitor and capture behavioral data relating to power consumption of the application in concern. A real-world example could include monitoring power input of Outlook, available from Microsoft Corporation of Redmond, Wash., and containerizing it according to a pre-specified power profile. This would in turn allow system to maximize app efficiency while minimizing power input required for the application.

To help the power policy manager 124 to determine the trust level of the virtual environments some embodiments may implement a power policy monitor 122 for containers. This component is the local authority that ensures the policies are properly communicated and enforced in the containers.

Figure 3:
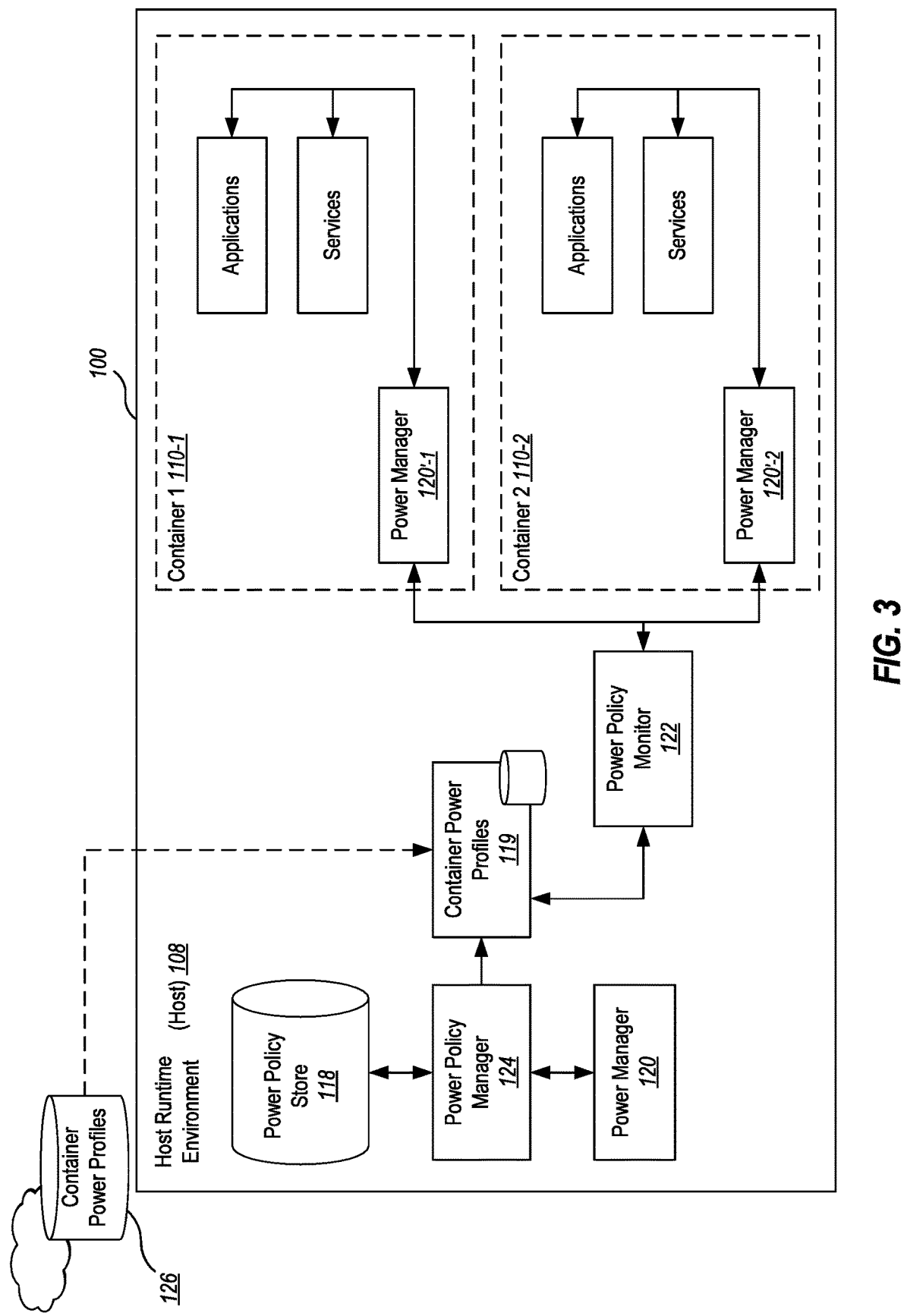
FIG. 3 illustrates a host system implementing a plurality of containers with one or more power profiles applied to the containers in the plurality of containers where power profiles can be obtained from a cloud environment.

As illustrated in FIG. 3, some embodiments may distribute (e.g. push, pull, and/or update) container power profiles from a cloud environment 126. In some embodiments, this can be used to implement more central control and synchronization of various power profiles. This architecture can in turn allow users to push shared power profiles to guest virtualized environments for maximum compute throughput. This essentially means both on-prem and cloud devices can have standardized power profiles for applications that can be shared between users using the same hardware settings.

As users continue to use containers for a wide variety of use cases, from build ops to app security, the power policy manager 124 on the host 108 creates unique power profiles for each of these containers. Containers operate on a short lifecycle model, where containerized environments need to be destroyed and recreated with the latest updates, on each new servicing event. These existing and stored power profiles can dynamically be applied each time a new container is initialized. With more behavioral analytics the power policy manager 124 can also decide when these containers are doing more energy dependent computation and adjust power settings accordingly in real time via the power policy monitor 122.

Figure 4:
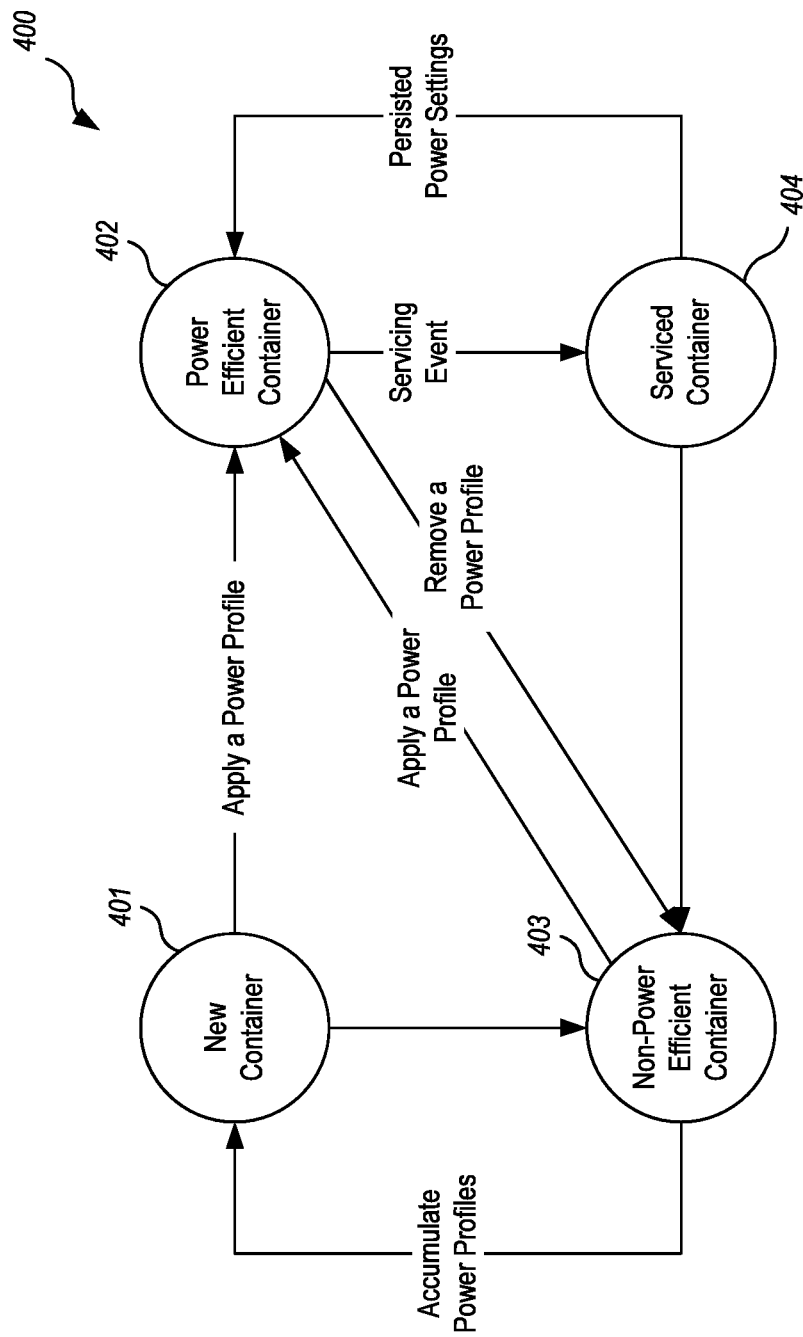
FIG. 4 illustrates a state diagram showing how containers can be configured to be power efficient containers.

Referring now to FIG. 4, a state diagram 400 is illustrated. The state diagram 400 shows how new or serviced containers can enter a state where they can be more power efficient by using the concept of power profiles. FIG. 4 illustrates that at state 401, a new container created. A determination may be made, as illustrated above, to apply a power profile to the new container. As illustrated at state 402, this causes a power efficient container to be created. Embodiments may remove power profiles from a given container which causes the container to be a non-power efficient container as illustrated at state 403.

Alternatively, as described above, a servicing event may take place, such as destroying and recreating a container, which results in a serviced container being created as illustrated at state 404. Because the power profiles are persisted, persisted power settings may be applied to the service container such that the container becomes a power efficient container as illustrated at state 402. Alternatively, the service container may be implemented such that persisted power settings in a power profile are not applied to the service container resulting in a non-power efficient container as illustrated at state 403.

Alternatively, embodiments may dynamically apply a power profile to a running container when changes (e.g. hardware capacity/capabilities, temperature change, etc). An example of this is illustrated in FIG. 4 when a power profile is applied and the state moves from state 403 to state 402.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
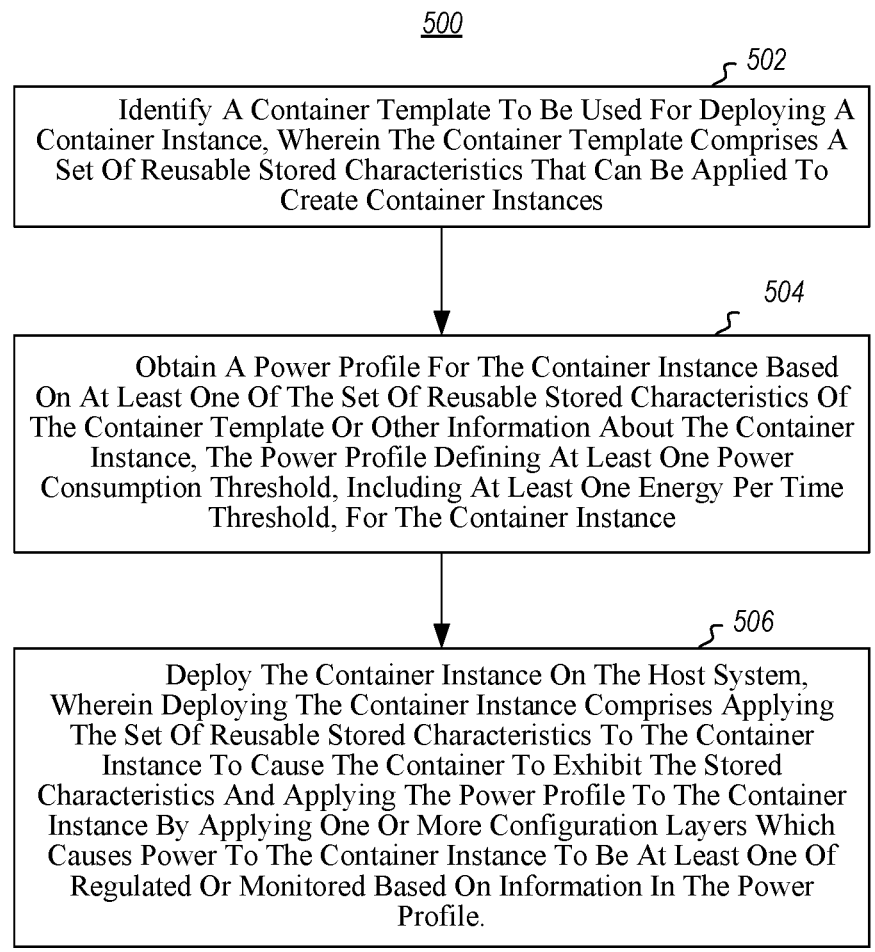
FIG. 5 illustrates a flowchart showing a method of deploying containers constrained by power profiles on a host system.

Referring now to FIG. 5, a method 500 is illustrated. The method may be practiced in a container based computing environment and includes acts for deploying containers constrained by power profiles on a host system.

The method 500 includes identifying a container template to be used for deploying a container instance, wherein the container template comprises a set of reusable stored characteristics that can be applied to create container instances (act 502). For example, FIG. 1 illustrates container templates 116 which may be used to create container instances such as container 110.

The method further includes obtaining a power profile for the container instance based on at least one of the set of reusable stored characteristics of the container template or other information about the container instance, the power profile defining at least one power consumption threshold, including at least one energy per time threshold, for the container instance (act 504). For example FIG. 1 illustrates power profiles 119. The power profile for a particular container can be selected based on information in the container templates 116 and/or other information about how the container one band will be deployed host system hundred.

The method 500 further includes deploying the container instance on the host system, wherein deploying the container instance comprises applying the set of reusable stored characteristics to the container instance to cause the container to exhibit the stored characteristics and applying the power profile to the container instance by applying one or more configuration layers which causes power to the container instance to be at least one of regulated or monitored based on information in the power profile (act 506). Thus for example the container 110 illustrated in FIG. 1 may have a container template from the container templates 116 and a power profile from the power profiles 119 applied to instantiate the container 110.

The method 500 may be practiced where the set of reusable stored characteristics comprises a trust level for the container instance such that container instances with lower trust levels are assigned power profiles with lower available power than containers with higher trust levels. Trust level may be determined in a number of different fashions. For example, trust level may be based on the type of user for which a container is instantiated. Alternatively or additionally, trust level may be based on the type of host system used to instantiate the container. Alternatively or additionally, trust level may be based on capacity of the container to use power. For example, if the container is unable to use large amounts of power, then for purposes of applying a power profile, the container may be highly trusted, as even if the container attempts to perform malicious power consuming actions, the container would not have sufficient access to resources to cause deleterious effects on the host system. Note that trust level may be different for different instances created using the same template, as discussed above.

The method 500 may be practiced where the set of reusable stored characteristics comprises information related to one or more applications identified in the container template to be instantiated when the container instance is deployed such that power profiles are assigned to container instances based on anticipated resource usage of the one or more applications. For example, a container template may include information that specifically identifies what applications are to be instantiated in a container. This information can be used to determine approximate amount of power needed by the container.

The method 500 may be practiced where the set of reusable stored characteristics comprises information related to hardware devices on the host that are anticipated to be used by the container instance. For example, the container template may identify various "purpose-specific processors" such as one or more: GPGPU, GPU, massively parallel processor, or FPGA. The information may be any of a type or family of a requested purpose-specific processors associated with the container template. Alternatively or additionally, the information may be an actual purpose-specific processor assigned to the instance that is deemed compatible for an application, service, setting, etc., specified in the template.

The method 500 may be practiced where the set of reusable stored characteristics comprises information related to typical power by previously deployed container instances created based on the container template. For example, embodiments may store information related to the amount of power consumed by well-behaved instances of containers created using a particular container template. This information can be used for selecting an appropriate power profile for a container. This could be a statistical analysis, such as by selecting the median or some with one or two standard deviations thereof, so as to exclude malfunctioning instances. This could be telemetry based or based on other self-reporting by container instances.

The method 500 may be practiced where applying the power profile limits power consumption by limiting at least one of a number of processor cycles over time that may be used by the container, an amount of storage I/O over time that may be performed for the container, or an amount of network traffic that may be sent or received for the container over time. As noted above, this may be accomplished by using configuration layers and/or filters to limit the resources available on the container 110. Alternatively or additionally, the container power manager 120' may have power settings and/or performance settings applied which can monitor and/or control power usage by applications and services in the container 110.

The method 500 may be practiced where applying the power profile causes a notification to be generated when actual measured power for the container exceeds a threshold. For example the container power manager 120' may be able to indicate to the host power manager 120 that the container 110 has exceeded threshold power usage.

In some such embodiments, as a result of the notification, the method may further include one or more of performing at least one of: destroying the container instance; diagnostic actions to determine why the container instance exceeds the threshold; modifying the container instance to reduce power; offloading operations performed for the container instance to a remote service, and streaming results of the offloaded operations to the container instance; or closing one or more applications based on a number I/O threads being used by the one or more applications.

Alternatively or additionally, in some such embodiments, the notification is generated based on at least one of aggregating power over time to determine an energy consumption or on an instantaneous rate of power consumption.

The method 500 may be practiced where identifying a container template comprises identifying a container template stored in a cloud environment. An example of this is illustrated in FIG. 3.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of limiting power consumption of container instances instantiated on a host, the method comprising:
   upon receiving a request to instantiate a container instance on the host,
      identifying a container template to be used for instantiating the container instance based on the request, the container template defining a set of operating characteristics including one or more hardware or software resources of the host to be surfaced to the container instance;
      assigning a power consumption threshold for the container instance based on the set of operating characteristics defined in the container template and one or more power consumption measurements of container instances previously instantiated according to the same container template; and
      instantiating the container instance on the host according to the container template;
   during execution of the container instance,
      monitoring consumption of the one or more hardware or software resources of the host consumed by the instantiated container instance;
      correlating the monitored consumption of the one or more hardware or software resources with a power consumption of the container instance; and
      determining whether the correlated power consumption exceeds the power consumption threshold of the container instance; and in response to determining that the correlated power consumption exceeds the power consumption threshold, reducing, from a current level, one or more of:
a number of processor cycles over time useable by the container instance;
an amount of storage input/output over time that can be performed for the container instance;
an amount of network traffic over time that can be sent or received for the container instance; or
a display setting available to the container instance, thereby reducing the power consumption of the container instance to be below the power consumption threshold.

2. The method of claim 1 wherein the container template also comprises a trust level for the container instance such that the power consumption threshold assigned to the container instance is lower than other containers with higher trust levels.

3. The method of claim 1 wherein the container template also comprises data identifying one or more applications to be instantiated, and wherein the assigned power consumption threshold corresponds to an anticipated resource usage of the one or more applications.

4. The method of claim 1 wherein the container template also comprises data identifying one or more hardware devices on the host that are anticipated to be used by the container instance.

5. The method of claim 1, further comprising generating a notification in response to determining that the correlated power consumption exceeds the obtained power consumption threshold.

6. The method of claim 1, further comprising:
in response to determining that the correlated power consumption exceeds the obtained power consumption threshold, performing one or more of:
destroying the container instance;
a diagnostic action to determine a reason the container instance exceeds the power consumption threshold;
offloading one or more operations performed for the container instance to a remote service and streaming results of the offloaded operations to the container instance; or
closing one or more applications executed in the container instance.

7. The method of claim 1 wherein correlating the monitored consumption includes aggregating power consumption of the container instance over time or correlating the monitored consumption of the one or more hardware or software resources to an instantaneous rate of power consumption.

8. The method of claim 1 wherein instantiating the container instance includes instantiating the container instance on the host according to the container template at a particular time or to run for a particular time based on the power profile.

9. A computing device configured to host one or more container instances, the computing device comprising:
a processor; and
a memory operatively coupled to the processor, the memory including instructions executable by the processor to cause the computing device to:
receive a request to instantiate a container instance on the computing device; and
in response to receiving the request to instantiate the container instance,
identify a container template to be used for instantiating the container instance based on the request, the container template defining a set of operating characteristics including one or more hardware or software resources of the host to be surfaced to the container instance;
assign a power consumption threshold for the container instance based on the set of operating characteristics defined in the container template and one or more power consumption measurements of container instances previously instantiated according to the same container template; and
instantiate the container instance on the host according to the container template, wherein the power consumption threshold is compared to a power consumption of the container instance correlated to consumption of the one or more hardware or software resources during operation; and
when the correlated power consumption exceeds the power consumption threshold, limit the consumption of the one or more hardware or software resources by the container instance such that the power consumption threshold is not exceeded.

10. The computing device of claim 9 wherein to limit the consumption of the one or more hardware or software resources includes to:
reduce, from a current level, one or more of:
a number of processor cycles over time useable by the container instance;
an amount of storage input/output over time that can be performed for the container instance;
an amount of network traffic over time that can be sent or received for the container instance; or
a display setting available to the container instance, thereby reducing the power consumption of the container instance to be below the power consumption threshold.

11. The computing device of claim 9 wherein to limit the consumption of the one or more hardware or software resources includes to:
perform one or more of:
destroying the container instance;
a diagnostic action to determine a reason the container instance exceeds the power consumption threshold;
offloading one or more operations performed for the container instance to a remote service and streaming results of the offloaded operations to the container instance; or
closing one or more applications executed in the container instance.

12. The computing device of claim 9 wherein the container template also comprises a trust level for the container instance such that the power consumption threshold assigned to the container instance is lower than other containers with higher trust levels.

13. The computing device of claim 9 wherein the container template also comprises data identifying one or more applications to be instantiated, and wherein the assigned power consumption threshold corresponds to an anticipated resource usage of the one or more applications.

14. The computing device of claim 9 wherein the container template also comprises data identifying one or more hardware devices on the host that are anticipated to be used by the container instance.

15. The computing device of claim 9 wherein to instantiate the container instance includes to instantiate the container instance on the host according to the container template at a particular time or to run for a particular time based on the power profile.

16. A method of limiting power consumption of container instances instantiated on a host, the method comprising:

during execution of a container instance on the host,
monitoring consumption of one or more hardware or software resources of the host consumed by the instantiated container instance on the host;

correlating the monitored consumption of the one or more hardware or software resources with a power consumption of the container instance; and determining whether the correlated power consumption exceeds a power consumption threshold associated with the container instance; and in response to determining that the correlated power consumption exceeds the power consumption threshold, reducing, from a current level, one or more of:

a number of processor cycles over time useable by the container instance;

an amount of storage input/output over time that can be performed for the container instance;

an amount of network traffic over time that can be sent or received for the container instance; or a display setting available to the container instance, thereby reducing the power consumption of the container instance to be below the power consumption threshold.

17. The method of claim 16, further comprising:
in response to determining that the correlated power consumption exceeds the obtained power consumption threshold, performing one or more of:
destroying the container instance;
a diagnostic action to determine a reason the container instance exceeds the power consumption threshold;
offloading one or more operations performed for the container instance to a remote service and streaming results of the offloaded operations to the container instance; or
closing one or more applications executed in the container instance.

18. The method of claim 16 wherein correlating the monitored consumption includes aggregating power consumption of the container instance over time or correlating the monitored consumption of the one or more hardware or software resources to an instantaneous rate of power consumption.

19. The method of claim 16 wherein correlating the monitored consumption of the one or more hardware or software resources with the power consumption of the container instance includes:

monitoring one or more of:
a number of processor cycles over time used by the container instance;
an amount of storage input/output over time performed for the container instance; or
an amount of network traffic over time sent or received for the container instance;

monitoring an overall power consumption of the host; and attributing a portion of the monitored overall power consumption to the container instance based on the monitored one or more of:
the number of processor cycles over time used by the container instance;
the amount of storage input/output over time performed for the container instance; or
the amount of network traffic over time sent or received for the container instance.

20. The method of claim 16 wherein correlating the monitored consumption of the one or more hardware or software resources with the power consumption of the container instance includes:

monitoring a power consumption by an application executed in the container instance, including:
determining a baseline power consumption of the container before the application is launched;
measuring a new power consumption when the application is launched in the container instance; and
setting a difference between the new power consumption and the baseline power consumption as the monitored power consumption by the application.

* * * * *